April 14, 1953 D. H. MITCHELL 2,634,528

OPERATING MANUAL FOR TUNING APPARATUS

Filed Oct. 24, 1945

INVENTOR.
Donald H. Mitchell,
BY Mueller, Dodds + Mason
Attys.

Patented Apr. 14, 1953 2,634,528

UNITED STATES PATENT OFFICE 2,634,528

OPERATING MANUAL FOR TUNING APPARATUS

Donald H. Mitchell, Chicago, Ill., assignor to Motorola, Inc., a corporation of Illinois Application October 24, 1945, Serial No. 624,170

1 Claim. (Cl. 40—68)

Figures 1, 2, 3:
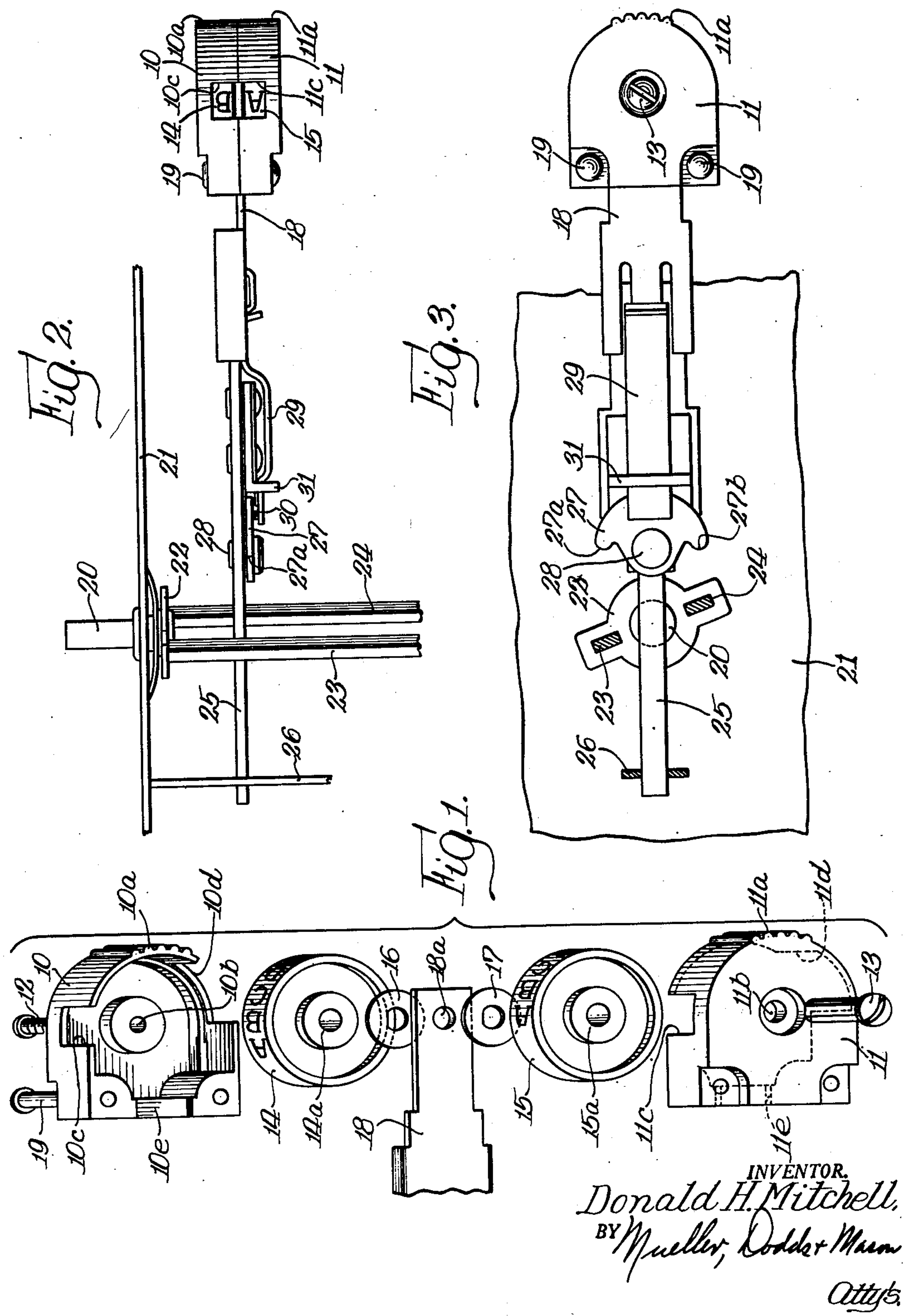

This invention relates to operating manuals for tuning apparatus and, while it is of general application, it is particularly adapted for embodiment in a manual of a push-button tuner of a radio receiver for a mobile vehicle, such as an automobile, aircraft, etc.

Automatic tuners of the push-button type have come into rather general use in radio receivers for aircraft, automobiles and other mobile vehicles. In such applications, the tuning apparatus includes provisions for changing the settings of the several push buttons as the vehicle travels from one area to another. For example, in an aircraft receiver there may be provisions for setting one or more of the push buttons to different range signals, beacon signals, broadcast signals, etc. In conventional push-button tuners for receivers of this type, there has been no provision for indicating to what particular station or signal each of the push buttons is set and heretofore there has been devised no such indicating provisions that could be readily reset in use.

It is an object of the invention, therefore, to provide a new and improved operating manual for tuning apparatus in which the setting indication of the manual may be readily changed in use.

It is another object of the invention to provide a new and improved operating manual for tuning apparatus in which the manual may be readily reset to indicate the characters of any desired transmitting station or signal simultaneously with adjustment of the tuning apparatus to such station or signal.

In accordance with the invention, an operating manual for a tuning apparatus of a wave-signal translating apparatus comprises an enclosing housing adapted to be contacted for operation and a plurality of elements rotatably mounted in the housing and having a plurality of peripheral indicia thereon, together with provisions for restraining free rotation of such elements. The housing has one or more apertures registering with the periphery of the elements for viewing the indicia thereon and provisions for producing rotation of the elements to change the visible indicia.

For a better understanding of the invention, together with other and further objects thereof, reference is had to the following description taken in connection with the accompanying drawings while its scope will be pointed out in the appended claim.

Referring now to the drawings, Fig. 1 is an exploded perspective view of an operating manual for tuning apparatus embodying the invention; Fig. 2 is a top plan view and Fig. 3 a side elevation of a portion of a conventional tuning apparatus, to which the operating manual of the invention is applied.

Turning now particularly to Fig. 1 of the drawing, there is illustrated an operating manual for a tuning apparatus of a wave-signal translating apparatus such as an aircraft receiver. This manual comprises an enclosing housing including a portion adapted to be contacted for operation and preferably constructed in the form of a pair of opposed molded plastic cup-like members 10 and 11. The members 10 and 11 are of complementary configuration so that, when secured in juxtaposition, they form an enclosing chamber, while they present an exterior surface of rectangular cross-section. The members 10 and 11 are provided with axially serrated or roughened surfaces 10a, 11a, respectively, adapted to be contacted by a finger of the user in operating the manual. The members 10 and 11 are further provided with aligned axial bores 10b, 11b, respectively, adapted to receive a cylindrical clamp or bolt 12 extending therethrough and cooperating with a sleeve nut 13 to retain the members 10 and 11 in opposed aligned relation.

The operating manual also includes a plurality of molded plastic wheel-like elements 14 and 15 mounted in the housing 10, 11 and rotatably mounted on the clamp 12, 13. The elements 14 and 15 have a plurality of peripheral indicia, such as transmitting-station call letters or characters preferably hot-stamped thereon. The manual further includes provisions for restraining free rotation of the elements 14 and 15 on the clamp 12, 13. For example, a pair of friction washers 16 and 17 disposed adjacent the hubs 14a and 15a of the elements 14 and 15, respectively. The resilient friction washers 16 and 17 are restrained from rotation on the clamp 12, 13 by suitable keys or keyways or, as shown, by the complementary flats on the washers and on the clamp sleeve 13.

The housing comprising the members 10 and 11 is provided with an aperture made up of opposed aligned apertures 10c and 11c in the upper peripheries of the members 10 and 11 and this aperture 10c, 11c is disposed to register with the periphery of the elements 14 and 15 for viewing the indicia, that is the station call letters or characters, on the elements 14 and 15.

The manual further includes provisions for producing rotation of the elements 14 and 15 to change the visible indicia. These provisions may be in the form of a second aperture consisting of opposed registering apertures 10d, 11d spaced from the contact portion 10a, 11a so as not to be accidentally engaged; for example, the aperture 10d, 11d is preferably on the underside of the manual housing. This aperture 10d, 11d is also disposed to register with the periphery of the indicia elements 14, 15 to permit frictional engagement therewith by the operator's finger to rotate the elements 14 and 15 individually to change the visible indicia. The operating manual is adapted to be supported on a push-button lever 18 having an aperture 18a near the end thereof for receiving and supporting the clamp 12, 13 while adjacent end surfaces of the members 10 and 11 are provided with recesses 10e and 11e, respectively, for engaging and clamping the manual rigidly on the rod 18 to be supported thereby. If desired, additional bolts or rivets 19 may be provided for clamping the elements 10 and 11 more securely to the operating rod 18. It will be understood that the members 10 and 11, being made of molded plastic, may be provided with reinforcing bosses and fillets, as required.

Referring now to Figs. 2 and 3, there is represented the application of a manual of the invention to an operating rod or lever of a tuning apparatus of the type including provisions individual to each operating rod for resetting the adjustment of the tuning apparatus corresponding to such rod. While the tuning apparatus may, of course, be of any desired type, there is illustrated by way of example a tuning apparatus of the treadle bar type. This apparatus comprises an actuating shaft 20, which may be connected to a tuning condenser or other tuning element, rotatably mounted in a frame member 21 and having secured thereto a crank disk 22 from which project parallel to the axis a pair of treadle bars 23 and 24. Extending between the treadle bars 23 and 24 is an actuating rod or lever 25 disposed for longitudinal motion transverse to the axis of the shaft 20 as by mounting it in a slide 26 forming a part of the frame 21. Carried by the rod 25 is a sector plate 27 pivotally supported on a pin 28. The plate 27 has a pair of shoulders 27a, 27b substantially diametrically opposed and disposed to engage the treadle bars 23 and 24, respectively, when the rod 25 is actuated to the left.

The rod 25 is coupled to the rod 18 through a mechanism which, upon relative longitudinal adjustment between the rods 25 and 18, is effective to clamp or release the plate 27 with respect to the actuating rod 25. This mechanism may be of any of several forms known in the art but is shown somewhat schematically as comprising a resilient clamping member 29 secured to or attached to the actuating rod 18 and extending to overlie the face of the plate 27. Frictional shoes 30 or the like may be disposed on the member 29 at its point of engagement with the disk 27. Overlying the clamping member 29 is a stirrup or bridge 31, which, when moved to the right, as viewed in Figs. 2 and 3, wedges the clamping member 29 into engagement with the disk 27 and, when moved to the left, releases the clamping member 29 for disengagement from the disk 27.

Since the tuning apparatus and its resetting mechanism, per se, constitutes no portion of the present invention and is well understood in the art, it is believed a detailed description is unnecessary. In brief, with the clamping member 29 forced into engagement with the disk 27 by the motion of the rod 18 to the right relative to the rod 25, actuation of the push button 10, 11 and the rods 18 and 25 to the left is effective to cause the shoulders 27a, 27b of the plate 27 to engage the treadle bars 23 and 24 and to actuate them to rotate the shaft 20 until the treadle bars are in alignment with the shoulders 27a, 27b. This position corresponds to the setting of the tuning apparatus to the desired signal or station corresponding to the particular push button. If it is desired to change the setting of the tuning apparatus corresponding to this button, the push button may be operated to the left beyond the position corresponding to a setting of the treadle bars 23 and 24 so that the stirrup 31 disengages the clamping member 29. Thereupon the tuning apparatus may be adjusted to any desired setting by manual tuning means (not shown) and the push button 10, 11 withdrawn to the right so that the stirrup 31 re-engages the clamping member 29 to clamp the disk 27 to the actuating rod 25.

It will be apparent that, with the operating manual of the invention described above, simultaneously with the operation of the push button 10, 11 to change the setting of the tuning apparatus, the elements 14 and 15 may be engaged by the finger of the operator through the lower aperture 10d, 11d to adjust these elements against the restraining bias of the friction washers 16, 17 to indicate the station or signal reference characters or call letters corresponding to the new setting of the tuning apparatus. The elements will, of course, be operated until the appropriate call letters or reference characters are visible through the upper aperture 10c, 11c. At the same time, the aperture 10d, 11d, being in the underside of the enclosing housing, is so disposed that accidental frictional engagement and movement of the elements 14 and 15 during the normal operation of the operating manual is unlikely to occur.

Thus with the operating manual of the invention, the indications of the several push buttons of a tuning apparatus of a mobile vehicle receiver may be readily changed from time to time as the setting of the tuning apparatus for each push button is changed when travelling from one locale to another.

While there has been described what is at present considered to be the preferred embodiment of the invention, it will be apparent to those skilled in the art that various changes and modifications may be made therein without departing from the spirit or scope of the invention.

What is claimed as new is:

Push button controlled apparatus including in combination, an operating lever, an operating manual on said lever having a housing with a portion adapted to be contacted for operating said lever, said housing including a pair of complementary cup-like portions, cylindrical clamp means supporting said housing portions in opposed aligned relation on opposite sides of said operating lever, a pair of elements rotatably mounted on said clamp means on opposite sides of said operating lever within said cup-like housing portions and having peripheral indicia thereon, said housing having at least one aperture therein for viewing said indicia.

DONALD H. MITCHELL.

References Cited in the file of this patent

UNITED STATES PATENTS

| Number | Name | Date |
|---|---|---|
| 176,594 | Burrow | Apr. 25, 1876 |
| 630,855 | Brooks | Aug. 15, 1899 |
| 1,787,860 | Hirsch | Jan. 6, 1931 |
| 1,915,563 | Wainwright | June 27, 1933 |
| 2,266,711 | Crosby et al. | Dec. 16, 1941 |
| 2,277,665 | Illmer | Mar. 31, 1942 |
| 2,408,302 | Eriksson | Sept. 24, 1946 |